United States Patent [19]

Stuart et al.

[11] 4,161,318

[45] Jul. 17, 1979

[54] SEALING SYSTEM FOR ROTORS

[75] Inventors: Alan R. Stuart, Sketchley Manor; Brian S. Stratford, Littleover, both of England

[73] Assignee: Rolls-Royce Limited, London, England

[21] Appl. No.: 886,605

[22] Filed: Mar. 14, 1978

[30] Foreign Application Priority Data

Mar. 26, 1977 [GB] United Kingdom ............... 12841/77

[51] Int. Cl.² ..................... F01D 11/04; F16J 15/40
[52] U.S. Cl. ........................................ 277/53; 277/74; 277/134; 415/110; 415/172 A; 60/39.66
[58] Field of Search ................. 277/53, 59, 70, 71, 277/72 R, 72 FM, 74, 79, 133, 134; 415/110, 112, 172 A, 172 R; 60/39.66

[56] References Cited

U.S. PATENT DOCUMENTS

| | | | |
|---|---|---|---|
| 2,685,429 | 8/1954 | Auyer | 415/110 |
| 2,963,268 | 12/1960 | Smile et al. | 277/53 X |
| 2,988,325 | 6/1961 | Dawson | 415/110 X |
| 3,189,320 | 6/1965 | Beldecos et al. | 415/112 X |
| 3,239,193 | 3/1966 | Kerensky | 415/110 |
| 3,279,378 | 10/1966 | Sproule | 415/110 |
| 3,437,313 | 4/1969 | Moore | 60/39.66 X |
| 3,756,740 | 9/1973 | Deich et al. | 277/53 X |
| 3,927,951 | 12/1975 | Mitsuhashi | 415/110 |

FOREIGN PATENT DOCUMENTS

| | | | |
|---|---|---|---|
| 136484 | 2/1950 | Australia | 415/110 |
| 2413655 | 10/1975 | Fed. Rep. of Germany | 277/53 |
| 1262633 | 4/1961 | France | 415/112 |
| 42114 | 11/1925 | Norway | 415/110 |
| 804922 | 11/1958 | United Kingdom | 415/172 A |
| 867600 | 5/1961 | United Kingdom | 415/172 |

*Primary Examiner*—Robert S. Ward, Jr.
*Attorney, Agent, or Firm*—Cushman, Darby & Cushman

[57] ABSTRACT

Turbine blade shrouds are sealed by injecting air on to the shroud immediately upstream of a shroud seal. This air serves two purposes: it creates a turbulent flow immediately upstream of the shroud seal, thus spoiling and reducing the leakage flow over the seal, and the hot gases which would otherwise leak over the seal are replaced by the cooler air, thus reducing energy wastage and improving S.F.C. (specific fuel consumption).

5 Claims, 4 Drawing Figures

SEALING SYSTEM FOR ROTORS

This invention relates to sealing systems for rotors, particularly between the radially outer peripheries of rotors and the surrounding stationary structure such as turbine rotors.

Considerable losses in efficiency can occur in a turbine if large clearances are provided between the ends of the turbine blades and a turbine casing, due to leakage of the propelling gases past the ends of the blades. But sufficiently large clearances must be provided so that as the speed of the turbine rotor increases and expands due to centrifugal forces and temperature differences, the tips of the turbine blades still remain clear of the casing.

It is an object of the present invention to provide a sealing system for a rotor which will reduce this leakage rate past the outer periphery of the rotor.

According to the present invention a sealing system for a rotor which is adapted to be supplied with a fluid comprises an annulus mounted on the periphery of the rotor and defining an annular clearance between the rotor and a stationary member surrounding the rotor, and means for injecting further fluid upstream of the annular clearance, but sufficiently close to the clearance to create a turbulent region in the fluid adjacent to the clearance, whereby the flow of fluid through the clearance is reduced.

The means for injecting further fluid may be located at a distance upstream of the annular clearance of substantially half the width of the clearance.

The annulus may comprise a radially extending flange formed on the periphery of the rotor, the radially outer end adapted to define an annular clearance between it and the stator, or the annulus may comprise an axially extending flange formed on the periphery of the rotor, the end of the flange defining an annular gap between it and a radially extending wall portion of the stator.

The rotor preferably comprises a bladed rotor having an outer annular shroud ring.

The bladed rotor may be a turbine rotor.

The invention also comprises a gas turbine engine having a sealing system as set forth above.

Embodiments of the invention will now be described by way of example only with reference to the accompanying drawings in which.

Figure 1:
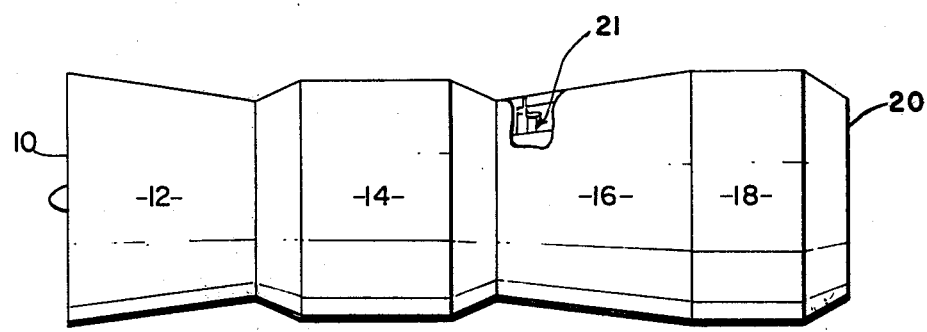
FIG. 1 is a schematic diagram of a gas turbine engine having a rotor in accordance with the invention.

In FIG. 1 there is illustrated a gas turbine engine comprising an air intake 10, a compressor 12, combustion equipment 14, a turbine 16, a jet pipe 18, and an exhaust nozzle 20.

The turbine 16 consists of a series of bladed rotors mounted within a casing, and a basic problem with turbines is to prevent hot gases from leaking past the outer ends of the blades and hence doing no work on the blades. This problem is minimized by providing an outer shroud ring on the tips usually with radially outwardly projecting annular seals.

Leakage still occurs, however, since sufficient clearance must be left between the edge of the annular seal and the turbine casing to allow for both differential thermal expansion of the turbine rotor relative to the casing and expansion due to centrifugal forces.

Figure 2:
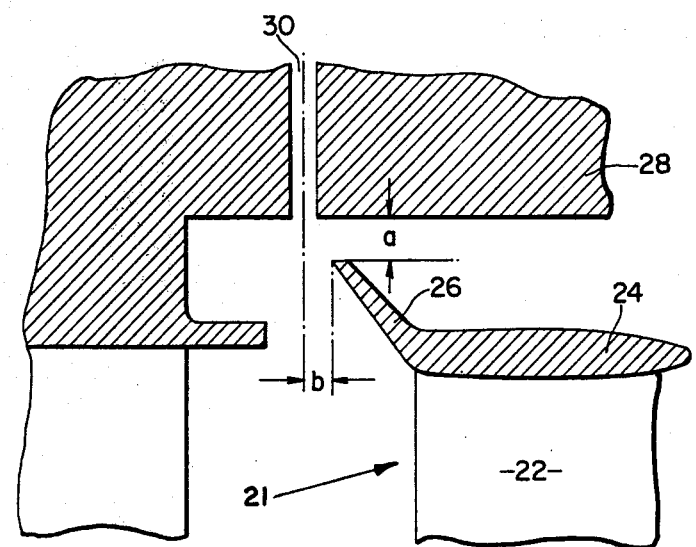
FIG. 2 is an enlarged fragmentary longitudinal sectional view of the turbine illustrating part of the turbine blade and the turbine stator.

In FIG. 2 there is shown part of a turbine of rotor 21 having a shroud ring 24 and a radially outwardly projecting annulus or seal 26. The annular seal 26 is adapted to reduce leakage between it and the turbine casing or stationary member 28, but an annular clearance a must be provided between the outer end of the seal 26 and the casing 28.

To reduce the leakage through this clearance a series of spaced orifices, only one 30 of which is shown, are formed in the turbine casing completely around the turbine rotor and in a plane slightly upstream of the radially outer end of the seal 26. These orifices 30 can have any suitable cross-sectional shape, and can be at an angle of substantially 90° to the internal surface of the turbine casing 28 as shown, or be arranged at an acute angle to the internal surface. They can also be, and are preferably angled tangentially to the internal surface of the turbine casing 28.

Figure 4:
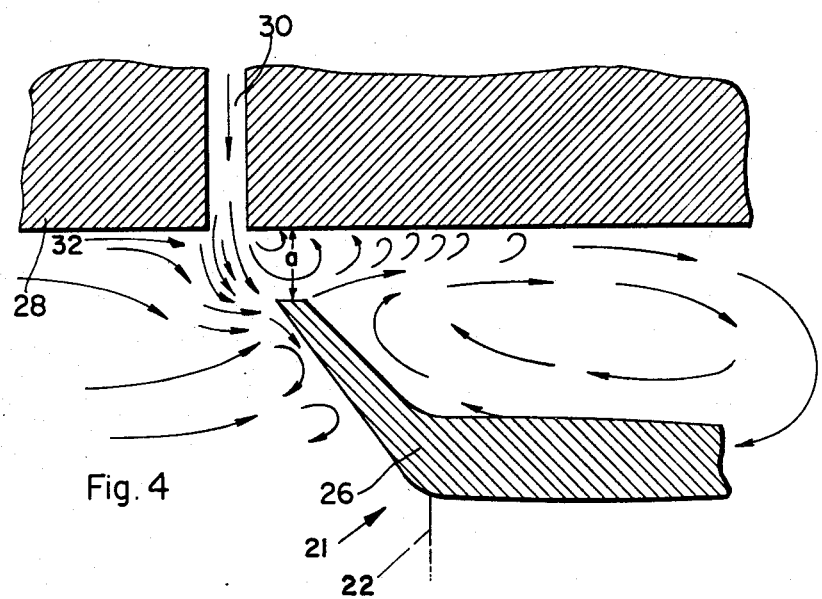

During operation of the turbine, pressurized air is supplied to the orifices 30, and is discharged therefrom as a curtain 32 of pressurized fluid transversely across the flow path of hot gases just upstream of the annular clearance a between annular seal 26 of rotor 21 and the stationary member or casing 28. This spoils the flow of the leaking gas over the seal 26 by causing a disturbance immediately upstream of and adjacent to the end of the seal 26 which blocks at least a portion of the hot gases from passing through the annular clearance a. This is illustrated in FIG. 4. Furthermore, a portion of the leaking gas flow is replaced by the cooler pressurized air from orifices so, thus a greater proportion of the hot gas is used to do useful work on the turbine blade 22. The pressurized air is tapped from the compressor 12 and is substantially cooler than the turbine gases and so the turbine blade shroud 24 and the annulus or annular seal 26 is cooled. Since there is less leakage of the hot gas, an improvement in the efficiency of the turbine can be achieved with a corresponding improvement in the S.F.C. (specific fuel consumption) of the engine.

It has been found that the best improvement is achieved if the dimension b is equal to half the clearance a, although improvements are also achieved if b is between 0 and $\frac{1}{2}$a, or greater than $\frac{1}{2}$a.

Figure 3:
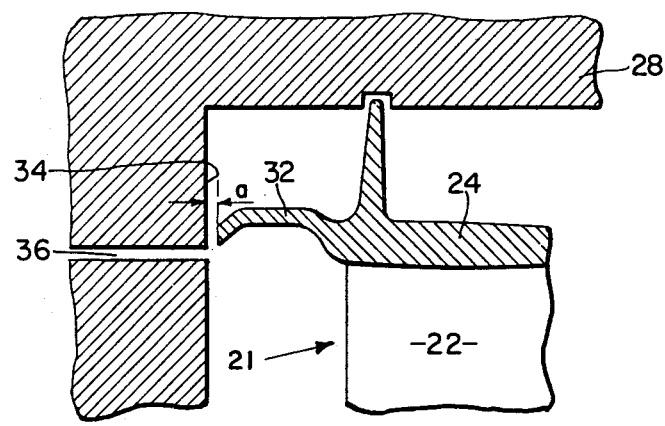
FIG. 3 is an enlarged fragmentary longitudinal sectional view of the turbine illustrating another embodiment of the invention and FIG. 4 show the airflow pattern over the end of a turbine blade shroud seal.

In FIG. 3 is shown a turbine blade 22 of rotor 21 with an axially upstream extending annulus or annular seal 32 formed on the blade shroud 24. This is adapted to extend closely up to a radial wall portion 34 of the turbine casing 28. To minimize leakage past this seal, axially extending orifices 36 are provided in the wall portion 34 which are supplied with pressurized air, as before. These orifices may also be formed at an angle to the interior surface of the wall portion 34. Since the hot gases in this case are attempting to leak radially past the end of the seal 32, the action of the pressurised air is as described before namely, transversely across the flow path of the hot gases just upstream of the annular clearance a, both spoiling the hot gas flow past the end of the seal 32 and replacing a portion of the hot gas flow with cooler air.

We claim:

1. A sealing system for a turbine of a gas turbine engine comprising:

a rotor arranged to be supplied with hot gases, a turbine casing defined by a stationary member surrounding said rotor, an annulus mounted on the periphery of said rotor, an annular clearance between said annulus and said stationary member, and means in said stationary member positioned just upstream of said annular clearance for injecting a high pressure cooling fluid transversely across a flow path of the hot gases in an area upstream of the annular clearance, said means providing a curtain of high pressure cooling fluid which blocks at least a portion of the hot gases from passing through said annular clearance to thereby increase the proportion of hot gases used to do useful work on said rotor.

2. A sealing system as claimed in claim 1 in which said means for injecting said high pressure cooling fluid is located at a distance upstream of said annular clearance of substantially half the width of the clearance.

3. A sealing system as claimed in claim 1 wherein said annulus comprises a radially extending flange, said flange being formed on the periphery of said rotor, the radially outer end of said flange defining said annular clearance between itself and said stationary member.

4. A sealing system as claimed in claim 1 wherein said annulus comprises an axially extending flange, said flange being formed on the periphery of the rotor, the end of said flange defining said annuluar clearance between itself and a radially extending wall portion of said stationary member.

5. A sealing system as claimed in claim 1 in which said rotor comprises a bladed rotor and an annular shroud ring, said annular shroud ring being joined to the outer ends of said blades.

* * * * *